United States Patent
Thunga (10) Patent No.: US 10,912,412 B2
(45) Date of Patent: Feb. 9, 2021

(54) GREASE CAPTURE SYSTEM FOR INDOOR GRILL COOKTOP UNIT

(71) Applicant: WHIRLPOOL CORPORATION, Benton Harbor, MI (US)

(72) Inventor: David M. Thunga, Libertyville, IL (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 341 days.

(21) Appl. No.: 15/386,553

(22) Filed: Dec. 21, 2016

(65) Prior Publication Data

US 2018/0168392 A1  Jun. 21, 2018

(51) Int. Cl.
*A47J 37/07* (2006.01)

(52) U.S. Cl.
CPC .................. *A47J 37/0713* (2013.01)

(58) Field of Classification Search
CPC ............. A47J 37/0713; A47J 37/0611; A47J 37/0676; A47J 36/32; A47J 37/06
USPC ......... 99/371, 330, 331, 339, 386, 349, 375, 99/378, 400, 425, 446
See application file for complete search history.

(56) References Cited

U.S. PATENT DOCUMENTS

| | | | |
|---|---|---|---|
| 3,095,495 A * | 6/1963 | Gvozdjak | A47J 37/04 126/41 R |
| 4,517,886 A | 5/1985 | Bales | |
| 4,862,795 A * | 9/1989 | Hawkins | A47J 37/0709 99/446 |
| 4,962,694 A * | 10/1990 | Graver | A47J 36/38 126/21 A |
| 5,000,157 A | 3/1991 | Harper, Jr. et al. | |
| 5,078,122 A * | 1/1992 | Kalenian | A47J 37/06 126/299 C |
| 5,190,026 A | 3/1993 | Doty | |
| 5,546,851 A * | 8/1996 | Goto | A47J 37/0676 99/446 |
| 5,713,265 A | 2/1998 | Strader et al. | |
| 5,870,946 A * | 2/1999 | Dudley | A47J 37/01 99/400 |
| 6,260,478 B1 * | 7/2001 | Harneit | A47J 37/067 99/400 |
| 6,314,871 B1 * | 11/2001 | Holbrook | A47J 37/0682 126/41 R |
| 2001/0037802 A1* | 11/2001 | Feldewerth | A47J 37/0713 126/41 R |
| 2010/0101558 A1* | 4/2010 | Murrin | A47J 37/0694 126/39 R |
| 2011/0049125 A1* | 3/2011 | Home | F24C 7/065 219/405 |
| 2014/0261009 A1 | 9/2014 | Bringe et al. | |

* cited by examiner

*Primary Examiner* — Tu B Hoang
*Assistant Examiner* — Masahiko Muranami
(74) *Attorney, Agent, or Firm* — Price Heneveld LLP (57) ABSTRACT

A grill module for a cooktop in a kitchen has a removable grease tray which collects the grease created by use of the grill module in grilling food. The grease is directed to the grease tray by a combination of burner cover(s), grease divertor(s), and angled surfaces on the grill module housing. The one-piece removable grease tray permits quick and easy removal of collected grease and retains the grease in a place where it cannot be heated to its flashpoint.

13 Claims, 8 Drawing Sheets

GREASE CAPTURE SYSTEM FOR INDOOR GRILL COOKTOP UNIT

BACKGROUND

Grilling units can be used to grill a variety of foods directly on the grate of the grilling unit. These grilling units can be incorporated into kitchen cooktops that are installed into an appliance or are installed directly in or on a kitchen countertop. One problem with grilling units is the collection and removal of grease from the grilling unit. Since grease has a flashpoint of approximately 230° C., grease must be collected and moved in order to prevent a grease fire. Cleaning and removing the collected grease typically involves disassembling and cleaning multiple components of the grilling unit on a fairly regular basis. Thus, there is a need for an improved apparatus and method for safely collecting grease and minimizing the number of components that need to be removed and cleaned in order to remove the collected grease.

BRIEF SUMMARY OF THE INVENTION

According to one aspect of the present invention, a cooktop assembly includes a cooktop housing, at least one cooktop unit coupled to the housing, and at least one grill module coupled to the housing. The grill module includes a grill housing with at least one least one surface supporting a grilling grate(s) with a plurality of openings. The grill module also includes at least one burner located underneath the grilling grate(s). A burner cover(s), angled to direct grease away from at least a portion of the burner(s) is located above the burner(s). At least one grease diverter, with at least one angled side, is located below the burner(s). The grill module unit also includes a removable grease tray, located below the grease diverter(s), supported by a plurality of tabs on the grill housing.

Yet another aspect of the present invention is grill module with a housing having at least one surface for supporting at least one grilling grate with a plurality of openings. The grill module includes at least one burner located underneath the grilling grate(s). At least one burner cover, angled to direct grease away from at least a portion of the burner(s), is located above the burner(s). At least one grease diverter with at least one angled side is located below the burner(s). A removable grease tray is located below the grease diverter(s) and is supported by a plurality of tabs on the grill housing.

Yet another aspect of the present invention is a method for diverting grease in a grilling cooktop unit. The method includes selecting a grilling unit housing with at least one surface for supporting at least one grilling grate. At least one burner is attached to a fuel source. The method includes installing at least one burner cover above the burner(s) angled to direct grease away from at least a portion of the burner(s). The method includes installing at least one grease diverter below the burner(s) with at least one angled side. The method includes installing a removable grease tray below the grease diverter(s) on a plurality of tabs on the grill housing.

These and other features, advantages, and objects of the present disclosure will be further understood and appreciated by those skilled in the art by reference to the following specification, claims, and appended drawings.

DETAILED DESCRIPTION OF THE PREFERRED EMBODIMENTS

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in the Figures. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

In this specification and the appended claims, the singular forms "a," "an," and "the" include plural reference unless the context clearly dictates otherwise.

For purposes of this disclosure, the term "coupled" (in all of its forms, couple, coupling, coupled, etc.) generally means the joining of two components (electrical or mechanical) directly or indirectly to one another, including, but not limited to, through the use of fasteners, other mechanical fasteners, adhesives, etc. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Figure 1:
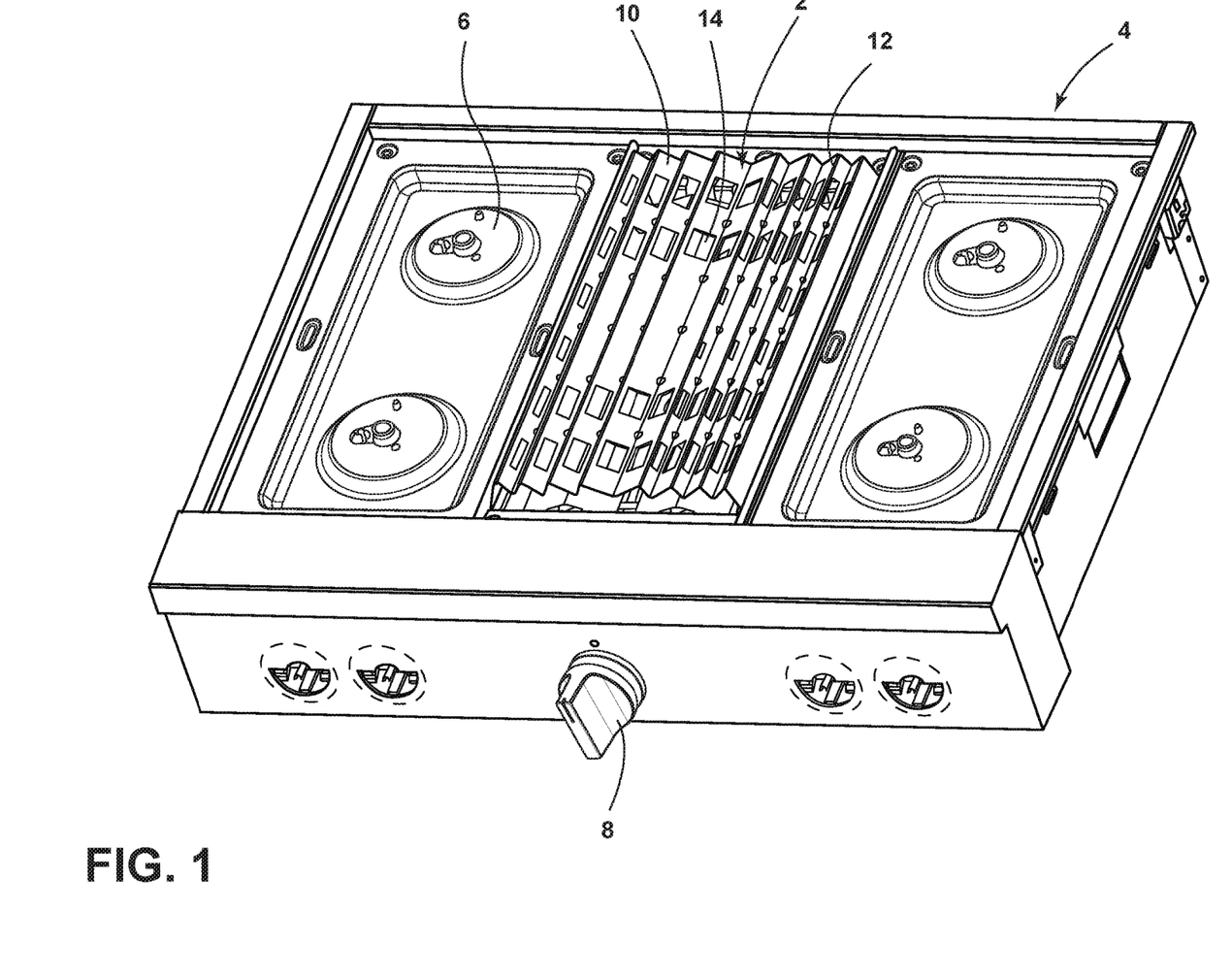
FIG. 1 is perspective view of a cooktop assembly that includes a grill module according to one embedment of the present invention.
Figure 2:
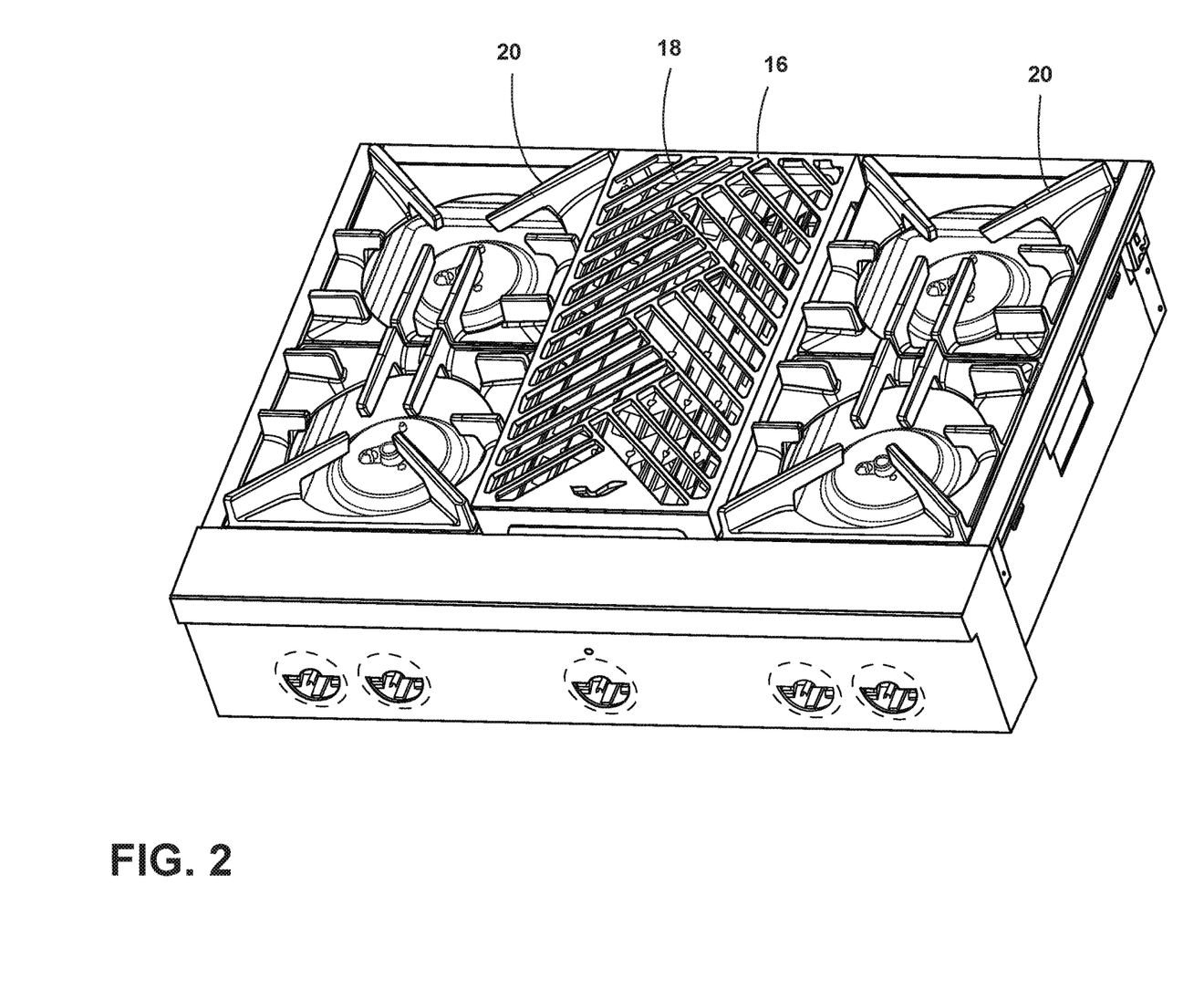
FIG. 2 is a perspective view of the cooktop assembly of FIG. 1 with a different grate installed above the grill module as well as grates installed above a the adjacent cooktop units.
Figure 3:
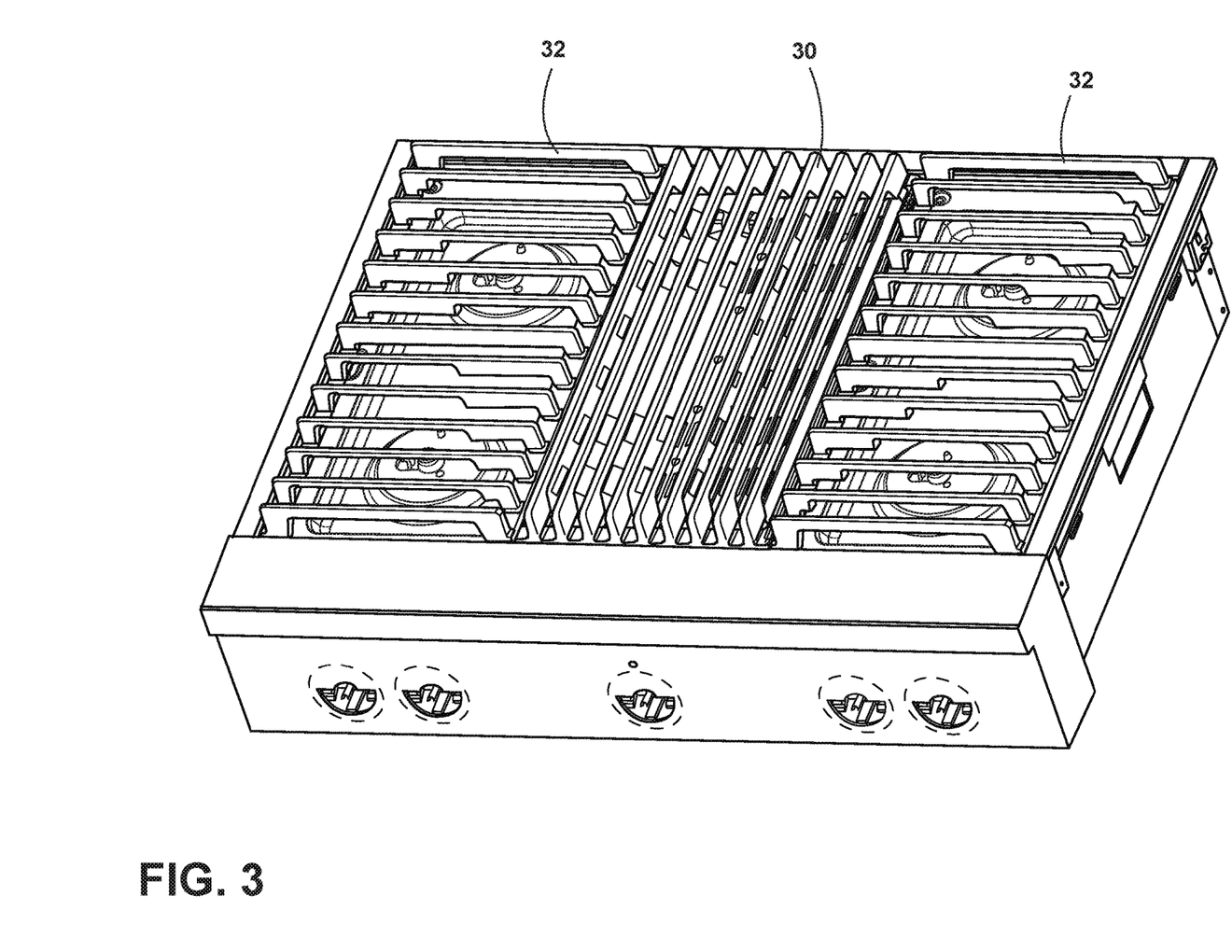
FIG. 3 is a perspective view of the cooktop assembly of FIG. 1 with different grates being used on the cooktop assembly.
Figure 4:
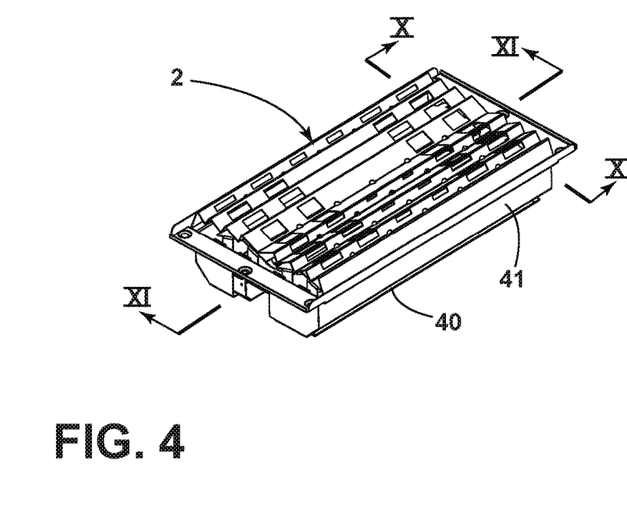
FIG. 4 is a top perspective view illustrating the top, the front, and left side of a grill module according to the present invention.
Figure 5:
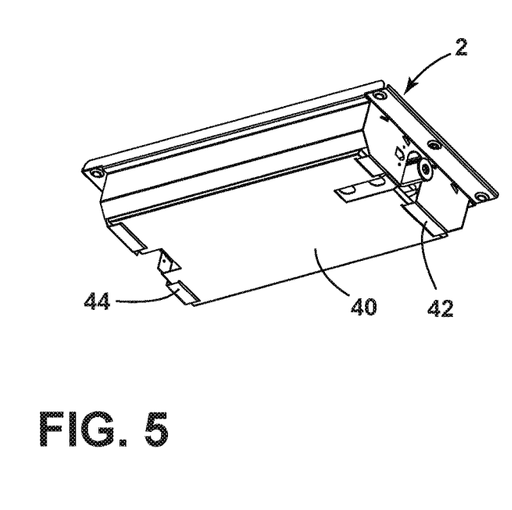
FIG. 5 is a bottom perspective view illustrating the bottom, front, and right side of the grill module of FIG. 4.
Figure 6:
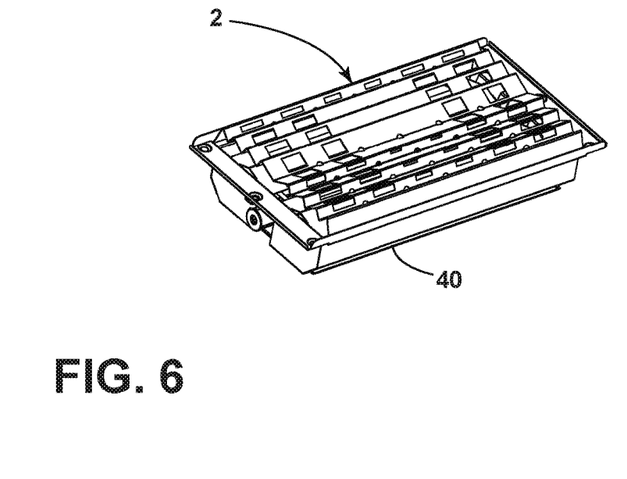
FIG. 6 is a top perspective view illustrating the top, right, and back side of the grill module of FIG. 4.
Figure 7:
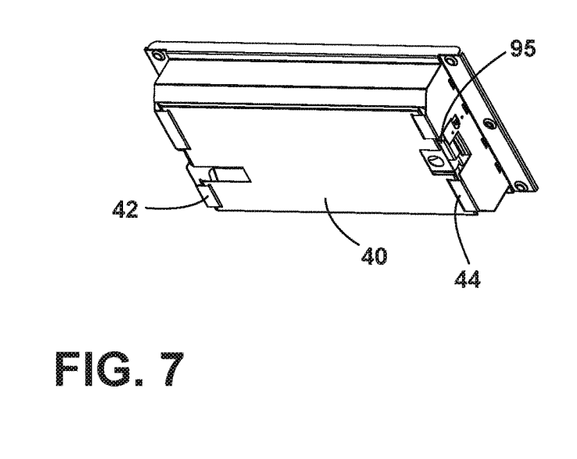
FIG. 7 is a bottom perspective view illustrating the bottom, back, and left side of the grill module of FIG. 4.

A cooktop assembly 4 is illustrated in FIGS. 1-3. The cooktop assembly 4 can include a number of cooktop units 6 and at least one grill module 2. The illustrated cooktop assembly 4 includes two gas cooktop units 6, each having two gas burners covered by a grate 20, as shown in FIG. 2. The cooktop assembly 4 can be connected to a fuel source, such as propane, natural gas, or other fuel source. The control of the cooktop assembly 4 can be accomplished by control knobs 8 (FIG. 1) or another dial, knob, switch, or other control mechanism.

A variety of grilling grates can be used in connection with the grill module 2. For example, FIG. 1 illustrates a grate 10 that has a plurality of openings 14 and holes 12. Other exemplary grates for the grill module 2 are illustrated in FIGS. 2 and 3. FIG. 2 illustrates a grate 16 with a plurality of openings 18, while FIG. 3 illustrates a grate 30 consisting of a series of upright members. Similarly, the grates for the burners on the cooktop unit 6 can be changed, as illustrated by the grates 32 in FIG. 3. It should be recognized that any shape of grate 10 can be used with the grill module 2 and cooktop unit 6, provided that the grate 10 provides openings for heat and/or flame.

Figure 8:
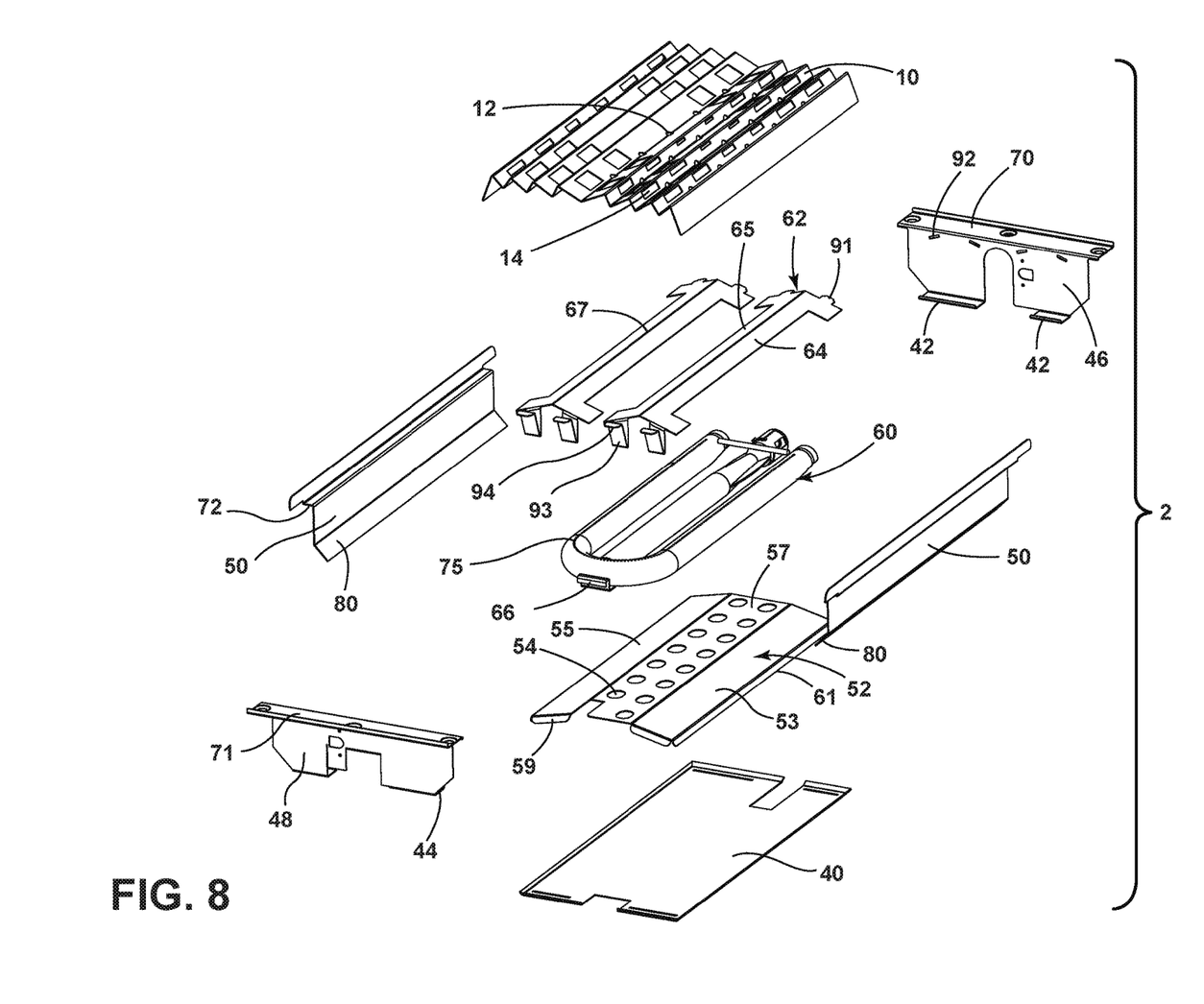
FIG. 8 is an exploded perspective view of the grill assembly according to an embodiment of the present invention.
Figure 9:
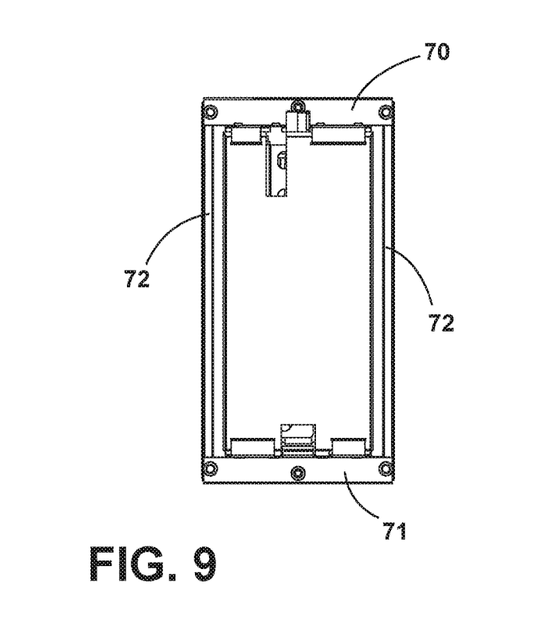
FIG. 9 is a top view of the grill module housing according to an embodiment of the present invention.
Figure 10:
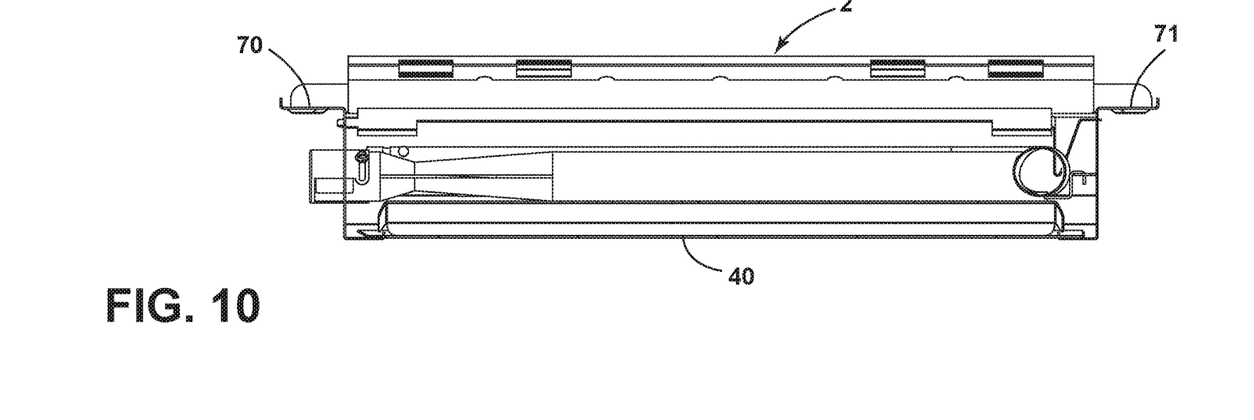
FIG. 10 is a cross-sectional view taken along the line shown in FIG. 4.

The grill module 2 of the present invention is illustrated by the components in FIG. 8. The grill module 2 includes a housing 41 which can be a unitary housing or can consist of a left wall 48, front and back walls 50, and a right wall 46. The left wall 48 can have a ledge 71, while the front and back walls 50 have a ledge 72 and the right wall 46 has a ledge 70 for supporting the grate 10. The housing 41 also includes a plurality of tabs 42. In the illustrated embodiment, two tabs 42 extend from the right wall 46 of the housing 41, while two tabs 44 extend from the left wall 48 of the housing 41.

The grill module 2 also includes burner covers 62, which include a ridge 67 and angled sides 64, 65. The burner covers 62 can have tabs 91 that connect to openings 92 in the right wall 46 of the grill housing 41. In addition, the burner covers 62 can have tabs 93 with ends 94 that extend through openings 95 in the left wall 48 of the grill housing 41.

Figure 11:
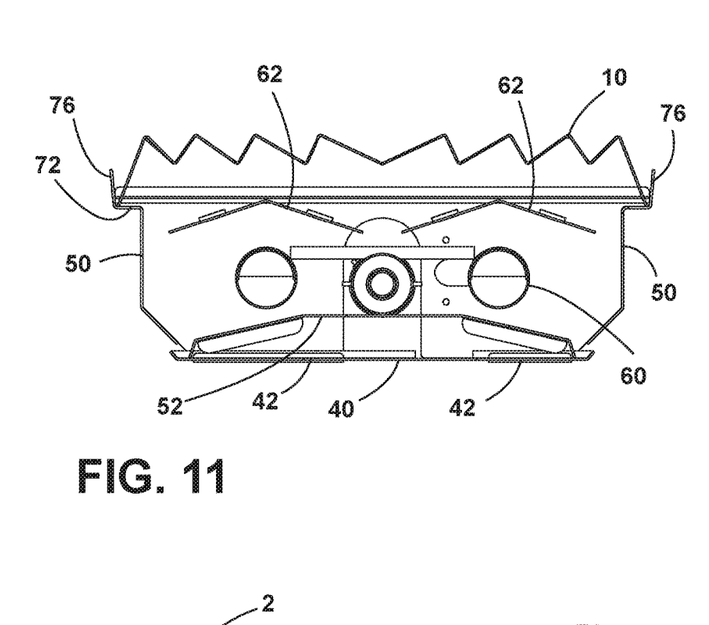
FIG. 11 is a cross-sectional view of the grill module taken along the line shown in FIG. 4.
Figure 12:
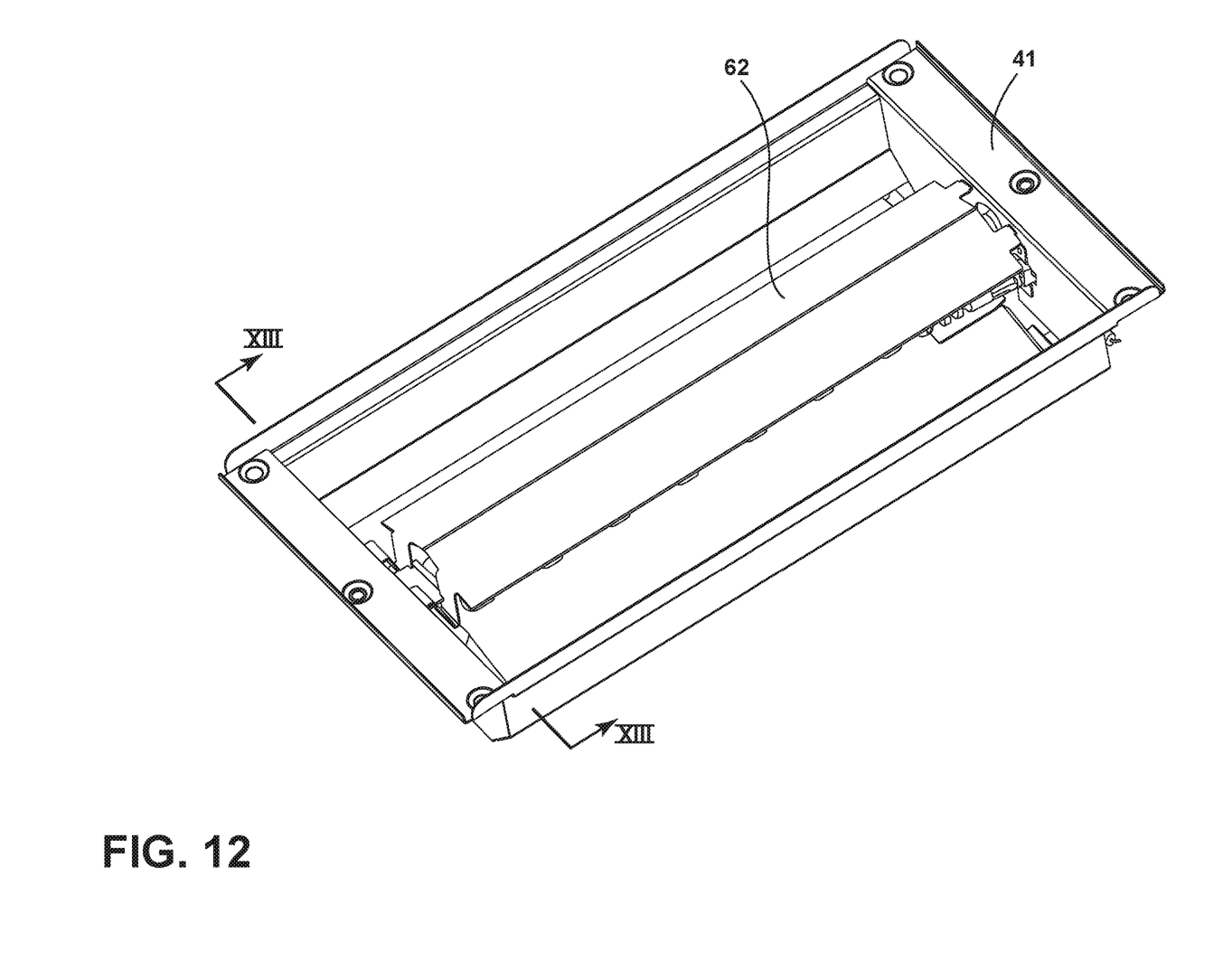
FIG. 12 is a top perspective view of a grill module with a single burner, according to an embodiment of the present invention.

In one illustrated embodiment (FIGS. 8, 11), a double burner 60, is used with two burner covers 62. The burner 60 can include a tab portion 66 that connects to the left wall 48 of the grill housing 41.

A grease diverter 52 is located below the burner 60. The grease diverter 52 has angled sides 53, 55 with a generally flat portion 57 between the angled sides 53, 55. The generally flat portion 57 includes a plurality of openings 54 that permit grease to exit the generally flat portion 57. These openings 54 are used primarily when the burner 60 is a double burner, as illustrated in FIG. 8. As can be seen, the double burner 60 has a generally U-shaped profile with holes 75 through which the flame emerges from the burner 60. The openings 54 permit any grease that falls in the generally U-shaped area between the sides of the burner 60 to drop down to the removable grease tray 40. When a single burner 60 is used, the grease diverter 52 can have openings 54 or can be a generally solid surface. The grease diverter 52 includes angled portions 59, 61 that help with the flow of the grease to the removable grease tray 40. The grease diverter(s) 52 can be connected to and/or sit on the grill housing 41.

Figure 13:
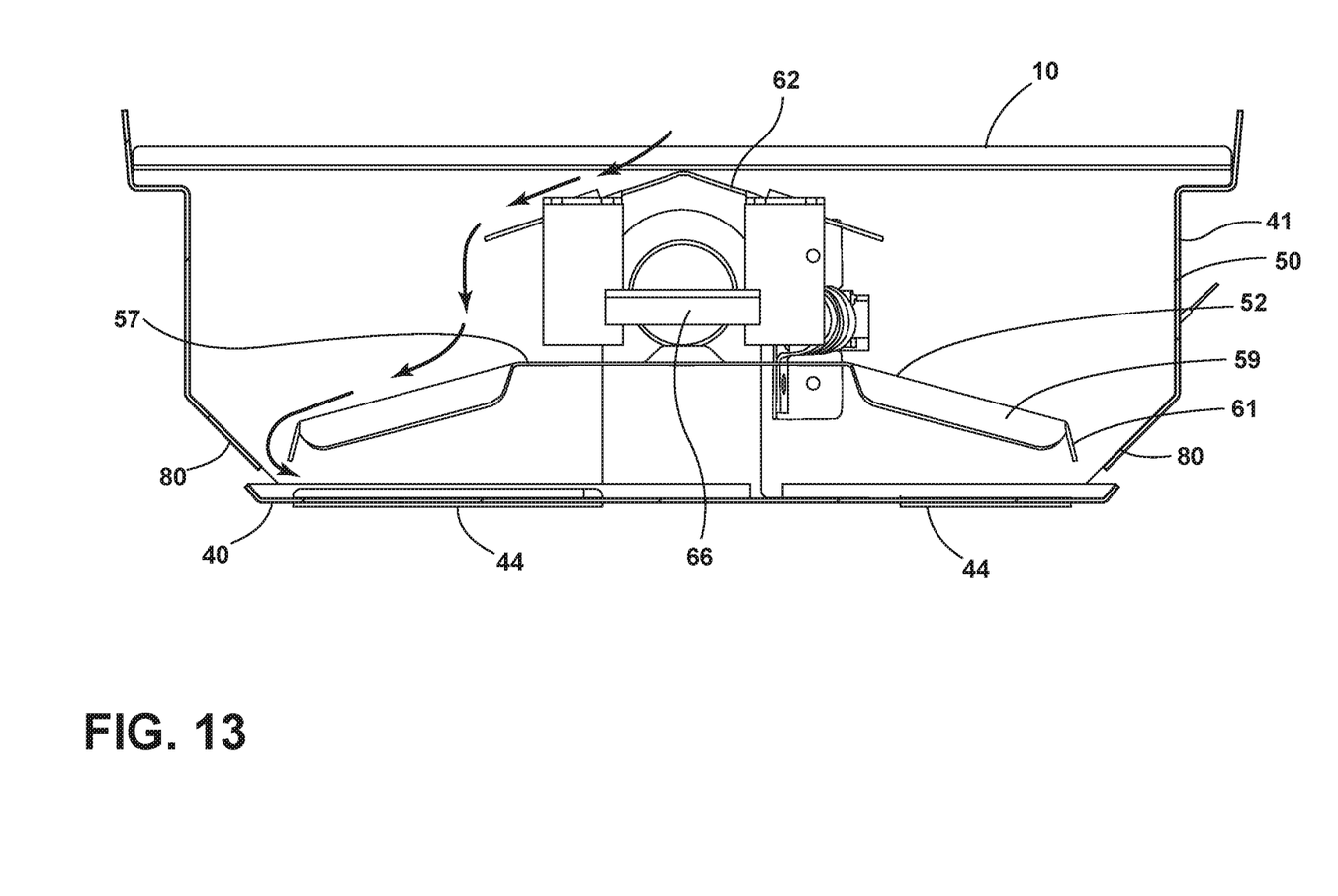
FIG. 13 is a cross-sectional view of the single burner grill module of FIG. 12, taken along the line shown in FIG. 12.

A removable grease tray 40 is received on the tabs 42, 44 of the grill housing 41. The removable grease tray 40 collects the grease that has fallen to the removable grease tray 40. As illustrated in FIG. 13, the path of the grease is shown by the arrows from the grate 10 down to the removable grease tray 40. The grease will be deflected by the burner cover(s) 62 and the grease diverter(s) 52 to fall into the removable grease tray 40. Angled pieces 80 in the front and back walls 50 of the grill housing 41 assist in the direction of the grease to the removable grease tray 40. Similarly, angled portions 59, 61 on the grease diverter(s) 52 help direct grease to the removable grease tray 40.

The removable grease tray 40 can be removed and cleaned to discard the grease collected from the grill module 2. The removable grease tray 40 is positioned to prevent the collected grease from reaching the flashpoint of grease, approximately 230° C. Thus, the depth of the grill housing 41, in combination with the grease diverter 52 and the position of the removable grease tray 40 all combine to keep collected grease in a place where it cannot be heated to 230° C.

Those skilled in the art will recognize, or will be able to ascertain using no more than routine experimentation, many equivalents to the specific embodiments of the invention described herein. Such equivalents are intended to be encompassed by the following claims.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

It will be understood by one having ordinary skill in the art that construction of the present disclosure and other components is not limited to any specific material. Other exemplary embodiments of the disclosure disclosed herein may be formed from a wide variety of materials, unless described otherwise herein.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A cooktop assembly, comprising:
   a cooktop housing;
   at least one cooktop unit coupled to the housing; and
   at least one grill module unit coupled to the housing, comprising:
   a grill housing having a plurality of lower angled surfaces at a terminal lower portion of opposites sides of the grill housing, at least one surface for supporting at least one grilling grate with a plurality of openings, and a plurality of tabs with portions extending upwardly, on terminal ends of opposite sides of the grill housing;
   at least one burner located underneath said at least one grilling grate;
   at least one burner cover, angled to direct grease away from at least a portion of said at least one burner including a plurality of tabs that are received in openings in said grill housing;
   at least one grease diverter contacting said grill housing, being a separate piece from said grill housing, located below said at least one burner, having a generally flat portion which includes a plurality of openings, with a plurality of angled sides angled downward towards said plurality of lower angled surfaces of said grill housing, the angled sides having a plurality of angled portions to direct grease away from said at least one burner and toward at least one gap located between said plurality of angled sides on said grease diverter and said lower angled surfaces on said grill housing; and
   a removable grease tray located below said at least one grease diverter that has a plurality of openings, on opposite sides of the grease tray, that receive said plurality of tabs on said grill housing.

2. The cooktop assembly of claim 1, wherein:
   said grill housing is comprised of a plurality of pieces.

3. The cooktop assembly of claim 1, wherein:
   said at least one burner is at least one gas burner.
4. The cooktop assembly of claim 1, wherein:
   said at least one burner cover is coupled to said grill housing.
5. The cooktop assembly of claim 1, wherein:
   said at least one grease diverter has a generally flat portion extending between two angled sides.
6. The cooktop assembly of claim 1, wherein:
   said at least one cooktop unit includes at least one generally circular gas burner.
7. The cooktop assembly of claim 1, wherein:
   said removable grease tray is positioned in the grill housing to keep collected grease at a temperature below the flashpoint of grease.
8. A grill module, comprising:
   a grill housing having a plurality of lower angled surfaces at a terminal lower portion of opposite sides of the grill housing, at least one surface for supporting at least one grilling grate with a plurality of openings, and a plurality of tabs with portions extending upwardly on terminal ends of opposite sides of the grill housing;
   at least one burner located underneath said at least one grilling grate;
   at least one burner cover, angled to direct grease away from at least a portion of said at least one burner, including a plurality of tabs that are received in openings in said grill housing;
   at least one grease diverter contacting said grill housing, being a separate piece from said grill housing, located below said at least one burner, having a generally flat portion which includes a plurality of openings, with a plurality of angled sides angled downward towards said plurality of lower angled surfaces of said grill housing, the angled sides having a plurality of angled portions to direct grease away from said at least one burner and toward at least one gap located between said plurality of angled sides on said grease diverter and said lower angled surfaces on said grill housing; and
   a removable grease tray located below said at least one grease diverter that has a plurality of openings, on opposite sides of the grease tray, that receive said plurality of tabs on said grill housing.
9. The grill module of claim 8, wherein:
   said housing is comprised of a plurality of pieces.
10. The grill module of claim 8, wherein:
    said at least one burner is at least one gas burner.
11. The grill module of claim 8, wherein:
    said at least one burner is coupled to said housing.
12. The grill module of claim 8, wherein:
    said at least one grease diverter has a generally flat portion extending between two angled portions.
13. The grill module of claim 8, wherein:
    said removable grease tray is positioned in the grill housing to keep collected grease at a temperature below the flashpoint of grease.

* * * * *